(12) United States Patent
Miyazaki

(10) Patent No.: US 6,330,282 B1
(45) Date of Patent: Dec. 11, 2001

(54) BLOCK MATCHING ARITHMETIC DEVICE AND RECORDING MEDIUM READABLE PROGRAM-RECORDED MACHINE

(75) Inventor: Takashi Miyazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/116,481

(22) Filed: Jul. 16, 1998

(30) Foreign Application Priority Data

Jul. 18, 1997 (JP) .................................................. 9-210077

(51) Int. Cl.[7] ........................................................ H04N 7/12
(52) U.S. Cl. ........................................................ 375/240.16
(58) Field of Search .................................. 348/416.1, 699, 348/700, 414.1, 407.1, 417.1; 375/240.12, 240.16; H04N 7/12

(56) References Cited

U.S. PATENT DOCUMENTS 6,052,706 * 4/2000 Wheeler et al. ...................... 708/631
6,167,090 * 12/2000 Iizuka .............................. 375/240.16

\* cited by examiner

*Primary Examiner*—Nhon T Diep
(74) *Attorney, Agent, or Firm*—McGuireWoods LLP

(57) ABSTRACT

A block matching arithmetic device that implements a block matching arithmetic operation while word data containing plural sets of image data is being input or output. Right-rotate-shifted current block creation means creates right-rotate-shifted current block by rotating a current block in the right direction every two pixels and then stores it into a current block storage section. Left-rotate-shifted reference data creation means creates left-shifted reference area by rotating a reference area in the left direction by one pixels and then stores it into a reference area storage section. A sub-block matching arithmetic means implements a block matching arithmetic operation in parallel every sub-blocks obtained by dividing a block in two strings to obtain sub-block matching data. Sum arithmetic means selects sub-block matching arithmetic data regarding the same motion vector and computes the sum of selected arithmetic data, thus obtaining a block matching arithmetic result.

10 Claims, 18 Drawing Sheets

BLOCK MATCHING ARITHMETIC DATA

| a(0,0) | a(0,1) | a(0,2) | ... | a(0,M-1) |
|---|---|---|---|---|
| a(1,0) | a(1,1) | a(1,2) | ... | a(1,M-1) |
| ⋮ | ⋮ | ⋮ | ... | ⋮ |
| a(N-1,0) | a(N-1,1) | a(N-1,2) | ... | a(N-1,M-1) |

(a)

CB(r) =

| a(0,(M-r)%M) | a(0,(M-r+1)%M) | a(0,(M-r+2)%M) | ... | a(0,(M-r-1)%M) |
|---|---|---|---|---|
| a(1,(M-r)%M) | a(1,(M-r+1)%M) | a(1,(M-r+2)%M) | ... | a(1,(M-r-1)%M) |
| ⋮ | ⋮ | ⋮ | ... | ⋮ |
| a(N-1,(M-r)%M) | a(N-1,(M-r+1)%M) | a(N-1,(M-r+2)%M) | ... | a(N-1,(M-r-1)%M) |

(b)

CB(0) =

| a(0,0) | a(0,1) | a(0,2) | ... | a(0,M-1) |
|---|---|---|---|---|
| a(1,0) | a(1,1) | a(1,2) | ... | a(1,M-1) |
| ⋮ | ⋮ | ⋮ | ... | ⋮ |
| a(N-1,0) | a(N-1,1) | a(N-1,2) | ... | a(N-1,M-1) |

CB(2) =

| a(0,M-2) | a(0,M-1) | a(0,0) | ... | a(0,M-3) |
|---|---|---|---|---|
| a(1,M-2) | a(1,M-1) | a(1,0) | ... | a(1,M-3) |
| ⋮ | ⋮ | ⋮ | ... | ⋮ |
| a(N-1,M-2) | a(N-1,M-1) | a(N-1,0) | ... | a(N-1,M-3) |

CB(4) =

| a(0,M-4) | a(0,M-3) | a(0,M-2) | ... | a(0,M-5) |
|---|---|---|---|---|
| a(1,M-4) | a(1,M-3) | a(1,M-2) | ... | a(1,M-5) |
| ⋮ | ⋮ | ⋮ | ... | ⋮ |
| a(N-1,M-4) | a(N-1,M-3) | a(N-1,M-2) | ... | a(N-1,M-5) |

⋮

CB(P-2) =

| a(0,M-P+2) | a(0,M-P+3) | a(0,M-P+4) | ... | a(0,M-P+1) |
|---|---|---|---|---|
| a(1,M-P+2) | a(1,M-P+3) | a(1,M-P+4) | ... | a(1,M-P+1) |
| ⋮ | ⋮ | ⋮ | ... | ⋮ |
| a(N-1,M-P+2) | a(N-1,M-P+3) | a(N-1,M-P+4) | ... | a(N-1,M-P+1) |

| b(-V,-H) | b(-V,1-H) | ... | b(-V,0) | b(-V,1) | b(-V,2) | ... | b(-V,H+M-1) |
|---|---|---|---|---|---|---|---|
| ⋮ | ⋮ | ⋮ | ⋮ | ⋮ | ⋮ | ⋮ | ⋮ |
| b(0,-H) | b(0,1-H) | ... | b(0,0) | b(0,1) | b(0,2) | ... | b(0, H+M-1) |
| b(1,-H) | b(1,1-H) | ... | b(1,0) | b(1,1) | b(1,2) | ... | b(1, H+M-1) |
| b(2,-H) | b(2,1-H) | ... | b(2,0) | b(2,1) | b(2,2) | ... | b(2, H+M-1) |
| ⋮ | ⋮ | ⋮ | ⋮ | ⋮ | ⋮ | ⋮ | ⋮ |
| b(V+N-1,-H) | b(V+N-1,1-H) | ... | b(V+N-1,0) | b(V+N-1,1) | b(V+N-1,2) | ... | b(V+N-1,H+M-1) |

(a)

RA(1)=

| b(-V1,-H) | b(-V,1+1-H) | ... | b(-V,1) | b(-V,1+1) | b(-V,1+2) | ... | b(-V, H+1+M-1) |
|---|---|---|---|---|---|---|---|
| ⋮ | ⋮ | ⋮ | ⋮ | ⋮ | ⋮ | ⋮ | ⋮ |
| b(0,1-H) | b(0,1+1-H) | ... | b(0,1) | b(0,1+1) | b(0,1+2) | ... | b(0, H+1+M-1) |
| b(1,1-H) | b(1,1+1-H) | ... | b(1,1) | b(1,1+1) | b(1,1+2) | ... | b(1, H+1+M-1) |
| b(2,1-H) | b(2,1+1-H) | ... | b(2,1) | b(2,1+1) | b(2,1+2) | ... | b(2, H+1+M-1) |
| ⋮ | ⋮ | ⋮ | ⋮ | ⋮ | ⋮ | ⋮ | ⋮ |
| b(V+N-1, 1-H) | b(V+N-1, 1+1-H) | ... | b(V+N-1,1) | b(V+N-1, 1+1) | b(V+N-1, 1+2) | ... | b(V+N-1, H+1+M-1) |

(b)

RA(0)=

| b(-V,-H) | b(-V,1-H) | ... | b(-V,0) | b(-V,1) | b(-V,2) | ... | b(-V,H+M-1) |
|---|---|---|---|---|---|---|---|
| ⋮ | ⋮ | ⋮ | ⋮ | ⋮ | ⋮ | ⋮ | ⋮ |
| b(0,-H) | b(0,1-H) | ... | b(0,0) | b(0,1) | b(0,2) | ... | b(0, H+M-1) |
| b(1,-H) | b(1,1-H) | ... | b(1,0) | b(1,1) | b(1,2) | ... | b(1, H+M-1) |
| b(2,-H) | b(2,1-H) | ... | b(2,0) | b(2,1) | b(2,2) | ... | b(2, H+M-1) |
| ⋮ | ⋮ | ⋮ | ⋮ | ⋮ | ⋮ | ⋮ | ⋮ |
| b(V+N-1,-H) | b(V+N-1,1-H) | ... | b(V+N-1,0) | b(V+N-1,1) | b(V+N-1,2) | ... | b(V+N-1,H+M-1) |

RA(1)=

| b(-V,1-H) | b(-V,2-H) | ... | b(-V,1) | b(-V,2) | b(-V,3) | ... | x |
|---|---|---|---|---|---|---|---|
| ⋮ | ⋮ | ⋮ | ⋮ | ⋮ | ⋮ | ⋮ | ⋮ |
| b(0,1-H) | b(0,2-H) | ... | b(0,1) | b(0,2) | b(0,3) | ... | x |
| b(1,1-H) | b(1,2-H) | ... | b(1,1) | b(1,2) | b(1,3) | ... | x |
| b(2,1-H) | b(2,1-H) | ... | b(2,1) | b(2,2) | b(2,3) | ... | x |
| ⋮ | ⋮ | ⋮ | ⋮ | ⋮ | ⋮ | ⋮ | ⋮ |
| b(V+N-1,1-H) | b(V+N-1,2-H) | ... | b(V+N-1,1) | b(V+N-1,2) | b(V+N-1,3) | ... | x |

(c)

$$RB(1, v, h) = \begin{vmatrix} b(v, h+1) & b(v, h+1+1) & b(v, h+1+2) & \cdots & b(v, h+1+M-1) \\ b(v+1, h+1) & b(v+1, h+1+1) & b(v+1, h+1+2) & \cdots & b(v+1, h+1+M-1) \\ b(v+2, h+1) & b(v+2, h+1+1) & b(v+2, h+1+2) & \cdots & b(v+2, h+1+M-1) \\ \cdots & \cdots & \cdots & \cdots & \cdots \\ b(v+N-1, h+1) & b(v+N-1, h+1+1) & b(v+N-1, h+1+2) & \cdots & b(v+N-1, h+1+M-1) \end{vmatrix}$$

FIG.5

| CURRENT BLOCK | REFERENCE BLOCK | MOTION VECTOR | SUB-BLOCK MATCHING ARITHMETIC DATA |
|---|---|---|---|
| CB(r) | RB(l,v,h) | MV(v,h) | DF=‖CB(r)-RB(l,v,h)‖ |
| CB(0) | RB(0,v,h) | MV(v,h) | DF(v,h,0) − DF(v,h,M-2) |
| CB(0) | RB(1,v,h) | MV(v,h+1) | DF(v,h+1,0) − DF(v,h+1,M-2) |
| CB(2) | RB(0,v,h) | MV(v,h+2-M) | DF(v,h+2-M,M-2) |
| | | MV(v,h+2) | DF(v,h+2,0) − DF(v,h+2,M-4) |
| CB(2) | RB(1,v,h) | MV(v,h+3-M) | DF(v,h+3-M,M-2) |
| | | MV(v,h+3) | DF(v,h+3,0) − DF(v,h+3,M-4) |
| CB(4) | RB(0,v,h) | MV(v,h+4-M) | DF(v,h+4-M,M-4) − DF(v,h+5-M,M-2) |
| | | MV(v,h+4) | DF(v,h+4,0) − DF(v,h+4,M-6) |
| CB(4) | RB(1,v,h) | MV(v,h+5-M) | DF(v,h+5-M,M-4) − DF(v,h+5-M,M-2) |
| | | MV(v,h+5) | DF(v,h+5,0) − DF(v,h+5,M-6) |
| .... | .... | .... | |
| CB(P-2) | RB(0,v,h) | MV(v,h+P-2-M) | DF(v,h+P-2-M,M-P+2) − DF(v,h+P-2-M,M-P-2) |
| | | MV(v,h+P-2) | DF(v,h+P-2,0) − DF(v,h+P-2,M-P) |
| CB(P-2) | RB(1,v,h) | MV(v,h+P-1-M) | DF(v,h+P-1-M,M-P+2) − DF(v,h+P-1-M,M-P-2) |
| | | MV(v,h+P-1) | DF(v,h+P-1,0) − DF(v,h+P-1,M-P) |

FIG.6

CONCATENATION RIGHT SHIFT INSTRUCTION  shr3  r1,r2,r3

```
for(j=0; j<16; j++){
  for(i=0; k<2; i++){
    /* load 8 bytes of source data from frame1 */
    sp1 = (vis_d64*)vis_alignaddr(sa1,0);
    s10 = sp1[0];
    s11 = sp1[1];
    sd1 = vis_fa;igndata(s10,s11);
    /*load 8 bytes of source data from frame2*/
    sp2 = (vis_d64*)vis_alignaddr(sa2,0);
    s20 = sp2[0];
    s21 = sp2[1];
    sd2 = vis_fa;igndata(s20,s21);
    accum = vis_pdist(sd1, sd,accum);
    sa1+=8;
    sa2+=8;
  }
  sl1=sa1=sl1+f1lb;
  sl2=sa2=sl2+f2lb;
}
```

BLOCK MATCHING ARITHMETIC DEVICE AND RECORDING MEDIUM READABLE PROGRAM-RECORDED MACHINE

BACKGROUND OF THE INVENTION

The present invention relates to an art of compressing and encoding digital video, and more particularly to a block matching arithmetic device for use in motion vector search.

The video compression coding technique is a technique of greatly compressing an enormous amount of information using high temporal correlation of video signals, spacial correlation, and human's visual characteristics of video signals. The video compression coding technique can realize very high compression ratio by combining the inter-frame predictive coding technique, conversion coding technique, and variable-length coding technique. Here, the word "frame" means one screen forming video.

The inter-frame predictive coding technique utilizes the correlation of the temporal direction of video and relates to a method of predicting a current frame based on a reference frame and then transmitting a predictive error signal. There are as an improved inter-frame predictive coding technique an inter-motion-compensation-frame predictive coding scheme in which the motion of a time-varying image is considered, inter-field predictive coding scheme in which inter-frame prediction is replaced with inter-field prediction, and an interpolation predictive coding scheme which performs interpolation by a past reference frame and a future reference frame. There is further an adaptive predictive coding scheme which adaptively selects plural predictive coding schemes described above.

The conversion coding technique is a technique of compressing information contents by linearly converting plural signals. The conversion coding technique is commonly applied to a predictive error signal in a space (horizontal, or vertical) direction in the adaptive predictive coding scheme. In this conversion, the redundancy in a space direction appears noticeably in an image signal. Like the adaptive predictive coding scheme, the conversion coding technique includes an adaptive conversion coding scheme that adaptively selects plural conversion schemes such as a frame conversion coding, a field conversion coding, and a conversion coding only in the horizontal direction.

The variable-length coding technique is a technique of compressing information contents using the tilt of a signal level probability distribution and is generally applied to motion vector in the adaptive predictive coding scheme and conversion coefficient in the adaptive conversion coding scheme. ITU-T H.261 or ISO IS1172(MPEG-1) being the international standard scheme for a time-varying compression coding adopts as an interframe predictive coding scheme an inter-motion-compensation-frame predictive coding scheme using motion vectors. In this scheme, the current frame 151, as shown in FIG. 15, is divided into blocks (current blocks) 152 formed of, for example, (N (lines)×M (rows)) pixels (generally, 16×16). The motion vector search areas 154 for searching motion vectors on the reference frame 153 are set to be (2V (lines)×2H (rows)) pixels, where when the center point of a current block is set to, for example, the coordinates (0, 0), the coordinate on the horizontal line ranges from −H to H−1 while the coordinate on the vertical line ranges from −V to V−1. Then, the motion vector is worked out by searching the reference block 155 which provides the smallest difference to the current block within the search range.

For example, when the image is still, the difference becomes zero if the reference block which is at the same position as the current block, that is, has the coordinates (0, 0) is a predictive block. If the reference block which is shifted from the candidate block at the same position by h pixels rightward and v pixels downward has the smallest distortion, the block with the coordinates (v, h) is provided as a predictive block. Thus the motion vector MV(v, h) is transmitted. The difference computation will be described here. When the pixel on the upper left of the current block 152 is represented as a(0, 0) and the pixel on the reference frame corresponding to the coordinates a(0, 0) of the current block is represented as b(0, 0), the pixel on the upper left of the reference block 155 where the motion vector becomes MV(h, v) is represented as b(h, v). In this case, the distortion D(h, v) of the current block 152 and the reference block 155 is represented by the following formula (1):

$$D(h,v) = \Sigma\Sigma \|b(h+m, v+n) - a(m,n)\| \quad (1)$$

where ‖ is the norm for computing a distortion. An absolute difference or square error is generally performed. However, an absolute difference operation is frequently used in terms of the complexity and efficiency of computation.

As described above, the method of comparing a current frame and a reference frame in block units is called a block matching method. Where a motion vector is searched in pixel units, (2V×2H) reference blocks per current block exits in the motion vector search area 154. When all current blocks in a current frame are searched for a motion vector, an enormous amount of operation is required for the block matching arithmetic operation. Conventionally, the device, for example, disclosed by JP-A-No. 340538/1996 is known as a high-speed, high performance motion vector search device. This device is a device used for only the motion vector search operation and includes plural processor elements to search a motion vector by implementing block matching operations in parallel for plural candidate blocks. However, such a device requires a great number of processor elements, thus resulting in a bulky, expensive device.

Recently, high-speed, high end microprocessors with 64-bit architecture have come to the market with the advance of semiconductor technology. As such a microprocessor can be listed UltraSparc I and II by Sun Microsystems, Alpha 21164 by DEC, R10000 by MIPS, PA-80000 by Hewlett-Packard, Power PC620 by Motrola, and so on. In some cases, a 64-bit arithmetic unit such as an ALU built in a microprocessor can be divided into eight 8-bit units, four 16-bit units, and two 32-bit units to process plural data in parallel by a single instruction. The SIMD (Single Instruction Stream, Multiple Data Stream) instruction improves the data operation capability according to data size by eight times, four times, or twice. In some microprocessors, an instruction for executing a data arithmetic operation peculiar to the process algorithm is added to speed a multimedia process such as graphic process or image coding process.

Some UltraSparc processors by Sun Microsystems use an instruction set specially designed for a multimedia process called VIS (Visual Instruction Set) (IEEE Micro, Vol. 16, No. 4, pp 10–20, August, 1996). The instruction set contains an pdist instruction used for motion vector search according to the block matching method. As shown in FIG. 16, the 64-bit register r1 stores eight 8-bit data a0 to a7 while the 64-bit register r2 stores eight 8-bit data bo to b7. The pdist instruction accumulates the sum of absolute values of references between eight 8-bit data of the register r1 and 8 pieces of 8-bit data of the register r2 at the corresponding positions with data of the register r3. Since the image data is formed of 8 bits, an block matching arithmetic operation for eight pixels can be implemented by the pdist instruction of one cycle. Where the block size of the block matching operation is 16×16, the error of a single motion vector candidate can be computed by executing the pidist instruction 32 times.

However, when the microprocessor reads or writes word data output from/to the data memory, data can be read or written by only the addresses aligned with the byte number of one word. For example, when one word is formed of 64 bits, word data can be read or written based on only the lower three bits formed of 000 among addresses grouped every 8 bits, that is, 0000h, 0008h, 0010h, 0018h, . . .

FIG. 17 illustrates a conventional block matching arithmetic device that executes a block matching arithmetic operation using a microprocessor. The block matching arithmetic device consists of a microprocessor 171 and a memory unit 172.

The microprocessor 171 is formed of a register file 173 and an arithmetic unit 174 that executes a data arithmetic operation. Here, it is assumed that the block size is 16×16.

When the upper right position of the reference block has b(0, 0), sixteen data b(0, 0) to b(0, 15) for one line of block correspond to two pieces of word data, that is, b(0, 0) to b(0, 7) and b(0, 8) to b(0, 15). Those data can be immediately used as source data of the pdist instruction that is executed in the arithmetic unit 174.

However, when the upper right position of the reference block has b(0, 1), sixteen data b(0, 1) to b(0, 16) for one line of block correspond to three word data, that is, b(0, 1) to b(0, 7), b(0, 8) to b(0, 15), and b(0, 16) to b(0, 23). Hence, if two word data b(0, 1) to b(0, 8) as well as b(0, 9) to b(0, 16) are not created by reading three word data out of the memory device 172 and then shifting the positions of them by the arithmetic unit 174, the sixteen data cannot be used as source data of the pdist instruction. The disadvantage is that the block matching arithmetic operation cannot be effectively executed because the data alignment procedure is needed.

For the purpose of data alignment, VIS instruction of UltraSparc prepares instruction alignaddr for address alignment and instruction faligndata for data alignment. Aligned word data is created by aligning data address decided by the position of a reference block and then loading two successive word data. The pdist instruction is executed by applying the procedure to the reference block and the current block.

FIG. 18 shows an example of a program written in C-language format to execute a block matching arithmetic operation of a block with a 16×16 size. In order to create two input data for pdist instruction, 8 instructions in totally including two alignaddr instructions, two faligndata instructions, and two load instructions (represented by substitution in a program) are executed. As a result, there is the disadvantage in that nine instructions in total are required to execute pdist instruction, so that the efficiency of the block matching arithmetic operation cannot be improved.

SUMMARY OF THE INVENTION

The objective of the present invention is to solve the above-mentioned tasks.

Moreover, the objective of the invention is to provide a program-recorded-machine-readable recording medium that can make a device that inputs and outputs data only word by word execute a fast block matching arithmetic operation.

Furthermore, the objective of the present invention is to provide a block matching arithmetic device that can make a device that inputs and outputs data only word by word execute a fast block matching arithmetic operation.

The objective of the present invention is achieved by a block matching arithmetic device wherein a block matching arithmetic operation between a current block and a reference block is executed to search a motion vector used for video compression coding, comprising a current block storage section; a reference area storage section; a sub-block matching arithmetic data storage section; right rotation shift current block creation means for creating plural right-rotate-shifted current blocks by rotating pixels in a current block to be processed in the right direction every two pixels and for storing the plural right-rotate-shifted current blocks and the current block into the current block storage section; left-shifted reference area creation means for creating a left shift reference area by shifting pixels in a reference area to the current block in the left direction by one pixel and for storing the left shifted reference area and the reference area into the reference area storage section; sub-block-matching arithmetic means for storing sub-block matching arithmetic data into the sub-block matching arithmetic data storage section, the sub-block matching arithmetic data being obtained by dividing a block to be combined into sub-blocks every two rows when a current block and a right-rotate-shifted current block taken out of the current block storage section are combined with the reference block taken out of the left shifted reference area and a reference area stored in the reference area storage section, and then implementing in parallel a block matching arithmetic operation to said sub-block groups; and sum arithmetic means for selecting sub-block matching arithmetic data required to compute a block matching arithmetic result regarding a motion vector, among sub-block matching arithmetic data in a reference area and sub-block matching arithmetic data regarding a reference block at a position horizontally spaced from the reference block by the number of rows of reference blocks, stored in the sub-block matching arithmetic data storage section, and then computing the sum of the data.

In the block matching arithmetic device according to the present invention, the right-rotate-shifted current block creation means defines positions of pixels in the first row as a word boundary when both a current block and a right-rotate-shifted current block are stored into the current block storage section; and the left-shifted area creation means defines positions of pixels in the first row as a word boundary when a reference area and a left-shifted reference area are stored into said reference area storage section.

In the block matching arithmetic device according to the present invention, wherein said sub-block matching arithmetic means comprises a program control arithmetic unit incorporated in a microprocessor, the arithmetic unit having an instruction of computing absolute values of differences between pixel data at the same position to two pieces of word data formed of plural pieces of pixel data to be input, adding two neighbor absolute values to obtain a sum, and accumulating the sum to an addition result obtained by a previous arithmetic operation.

Moreover according to the present invention, a machine-readable recording medium for recording a program which works as a block matching arithmetic device a computer including a current block storage section, a reference area storage section and a sub-block matching arithmetic storage section, the block matching arithmetic device executing a block matching arithmetic operation for a current block and a reference block to search a motion vector used for video compression coding, the program further operating the computer as functions of right rotation shift current block creation means for creating plural right rotation shift current blocks by rotating pixels of a current block to be processed in the right direction every two pixels and for storing the plural right-rotate-shifted current blocks and the current block into the current block storage section; left shift reference area creation means for creating a left shift reference area by shifting pixels in a reference area to the current block in the left direction by one pixel and for storing the left shift reference area and the reference area into the reference area storage section; sub-block matching arithmetic means for storing sub-block matching arithmetic data into the sub-block matching arithmetic data storage section, the sub-block matching arithmetic data being obtained by dividing a block to be combined into sub-blocks every two rows when a current block and a right rotation shift current block taken out of the current block storage section are combined with a reference area stored in the reference area storage section and the reference block taken out of the left shift current block, and then implementing in parallel a block matching arithmetic operation to sub-block groups; and sum arithmetic means for extracting sub-block matching arithmetic data required to compute a block matching arithmetic result regarding a motion vector, from sub-block matching arithmetic data in a reference area and sub-block matching arithmetic data regarding a reference block at a position horizontally spaced from the reference block by the number of rows of reference blocks, stored in the sub-block matching arithmetic data storage section, and then computing the sum of the data.

In the block matching arithmetic device according to the present invention, the current block is read out of a current frame memory; and the reference frame is read out of a reference frame memory.

In the block matching arithmetic device according to the present invention, the sub-block matching arithmetic operation is sequentially executed every combined blocks.

In the block matching arithmetic device according to the present invention, the sub-block matching arithmetic operation is executed by interleaving plural differently-combined blocks.

In the block matching arithmetic device wherein a block matching arithmetic operation between a current block and a reference block is executed to search a motion vector used for video image compression coding, comprises a current frame memory for storing current frame data; a reference frame memory for storing reference frame data; a block matching arithmetic result memory for storing block matching arithmetic results; a microprocessor connected to the current frame memory, the reference frame memory and the block matching arithmetic result memory, for executing a block matching arithmetic operation and for creating plural right-rotate-shifted current blocks from a current block out of the current frame memory under a concatenation right-shifted instruction and for creating plural left-shifted reference areas from a reference area under a concatenation left-shifted instruction; a program memory connected to the microprocessor, for storing a program for the microprocessor; and a main storage memory connected to the microprocessor via a bus, for temporarily storing data.

In the block matching arithmetic device according to the present invention, the microprocessor comprises a register file for temporarily storing data; and a program controlled arithmetic unit which has a sub-block matching arithmetic instruction for executing data processing. The program controlled arithmetic unit also executes the concatenation right-shifted instruction and the concatenation left-shifted instruction. The program control arithmetic unit calculates a sub-block matching arithmetic data based on the current block and the reference block.

In the block matching arithmetic device according to the present invention, the main storage memory comprises a current block storage unit for storing data regarding the right-rotation-shifted current block in a word data format, a reference area storage unit, and a sub-block matching arithmetic data storage unit for storing the sub-block matching arithmetic data in a word data format.

In the above-mentioned configuration, the right-rotation-shifted current block creation means (refer to numeral 4 in FIG. 1) creates plural right-rotation-shifted current blocks obtained by clockwisely rotating the pixels of a current block every two pixels, stores the right rotation shift current block into the current block storage section, together with the current block (refer to 10 FIG. 1). The left reference area creation means (refer to 6 in FIG. 1) creates a left-shifted reference area obtained by shifting a reference area by one pixel in the left direction and then stores the left shift reference area into the reference area storage section, together with the reference area (refer to 11 in FIG. 1). The sub-block matching arithmetic means (refer to 7 in FIG. 1) obtains sub-block matching arithmetic data by combining a current block, a right-rotation-shifted current block, and a reference block taken out of the reference area and the left shift reference area and executing a block matching arithmetic operation in parallel of respective ranges obtained by dividing a block every two pixel rows. The sum arithmetic means (refer to 9 in FIG. 1) selects sub-block matching arithmetic results needed for a block matching arithmetic operation regarding a desired motion vector and then obtains the sum of the selected results.

That is, a block matching arithmetic operation is executed by previously creating a right-rotation-shifted current block obtained by shifting pixels of a current block and a left-shifted reference area obtained by shifting pixels of a reference area and then combining a current block, the right-rotate-shifted current block, and the reference block taken out of the reference area and the left shift reference area. Hence, even if the device can input and output data only in word units, it is not required to shift pixels every block matching arithmetic operation. Moreover, since the block matching arithmetic operation results of the entire block can be obtained by combining the results of a matching arithmetic operation of sub-blocks obtained by dividing a block, the sub-block matching arithmetic operation can be executed in parallel for different motion vectors based on a single reference block.

BRIEF DESCRIPTION OF THE DRAWINGS

This and other objects, features and advantages of the present invention will become more apparent upon a reading of the following detailed description and drawings, in which:

FIG. 2 is a table listing the positional relationships between pixels in a current block and pixels in a right-rotate-shifted current block;

FIG. 3 is a table listing the positional relationships between pixels in a reference area and pixels in a left-shifted reference area;

FIG. 5 is a table listing the relationships between reference blocks and pixel positions;

FIG. 6 is a table listing the relationships between combinations of a current block and a reference block and difference of sub-block matching arithmetic data;

FIG. 18 is a diagram illustrating a block matching arithmetic program used in a related-art block matching arithmetic device using a microprocessor.

DESCRIPTION OF THE EMBODIMENTS

Embodiments of the present invention will be described below in detail with reference to the attached drawings.

Figure 1:
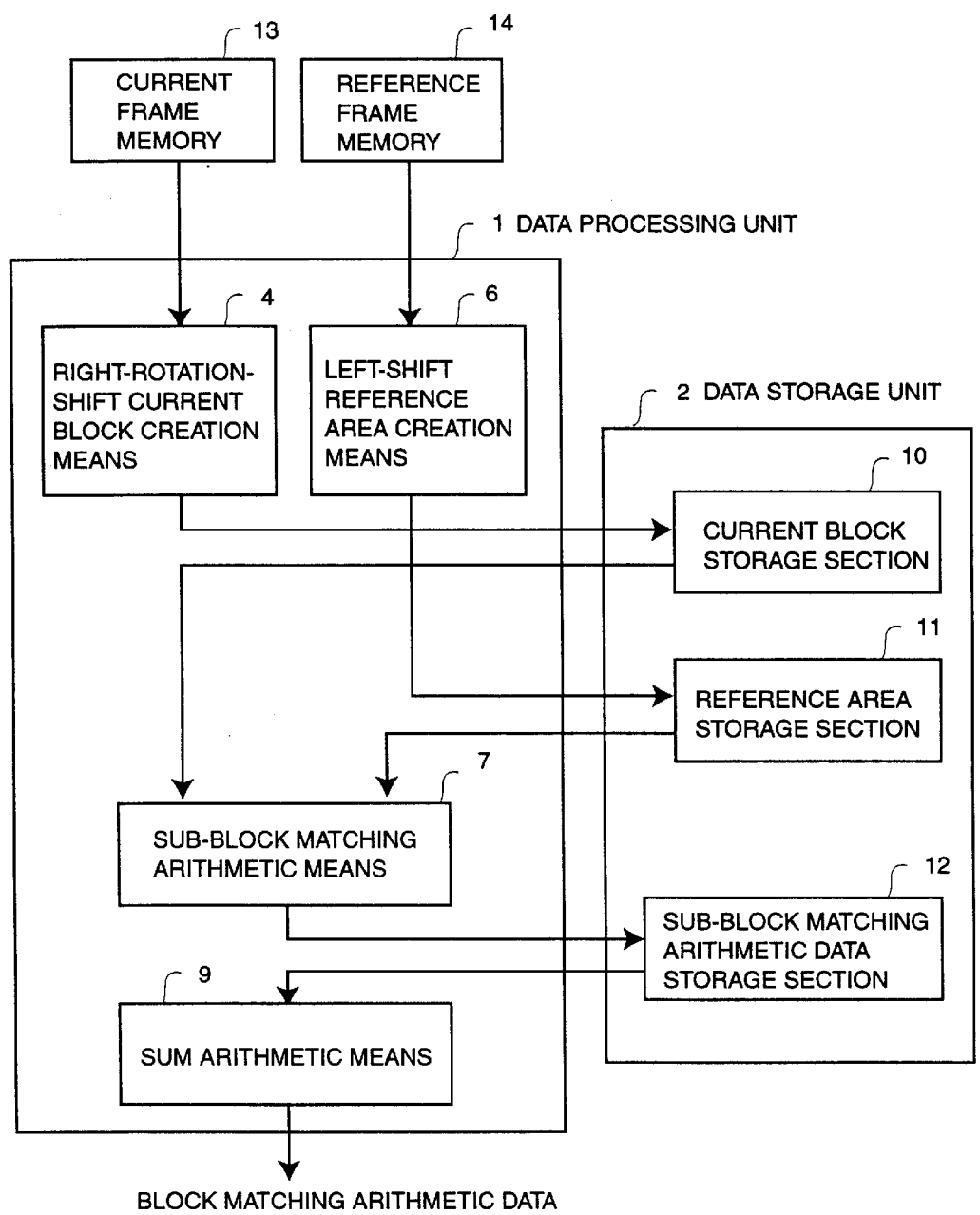
FIG. 1 is a block diagram illustrating a block matching arithmetic device according to an embodiment of the present invention.

FIG. 1 is a block diagram illustrating a block matching arithmetic device according to an embodiment of the present invention. Referring to FIG. 1, the block matching arithmetic device consists of a data processing unit 1 for executing a block matching arithmetic operation, a data storage unit 2, a current frame memory 13 for storing current frames, and a reference frame memory 14 for storing reference frames.

The data processing unit 1 includes right-rotate-shifted current block creation means 4, left-shifted reference area creation means 6, sub-block matching arithmetic means 7, and sum arithmetic means 9. The data storage unit 2 includes a current block storage section 10, a reference area storage section 11, and a sub-block matching arithmetic data storage section 12.

The right-rotate-shifted current block creation means 41 creates P/2 right-rotate-shifted current blocks by rotating pixels of an input current block from the current frame memory 13 by 0 pixel, 2-pixels, 4 pixels, . . . , (p−2) pixels in the right direction and then stores them into the current block storage section 10, where P is the number of pixels which can be processed in parallel by the sub-block matching arithmetic means 7.

The left-shifted reference area creation means 6 creates a left shift reference area by moving pixels of an input reference area from the reference frame memory 14 by one pixel in the left direction and then stores it into the reference area storage section 11, together with the input reference area.

The sub-block matching arithmetic means 7 subjects a current block stored in the current block storage section 10, right-rotate-shifted current blocks, a reference area stored in the reference area storage unit 11, and a reference block taken out of the left-shifted reference area to a sub-block matching arithmetic operation, and then stores the sub-block matching arithmetic data into the sub-block matching arithmetic data storage unit 12.

The summation arithmetic means 9 reads sub-block matching arithmetic data required for a block matching arithmetic operation of a motion vector out of the sub-block matching arithmetic data storage unit 12 based on a reference block and sub-block matching arithmetic data regarding a reference block separated from the reference block by the number of reference block rows in the horizontal direction, and then computes the sum of them.

Next, the operation of the block matching arithmetic device will be described below by referring to FIG. 1.

Figure 4:
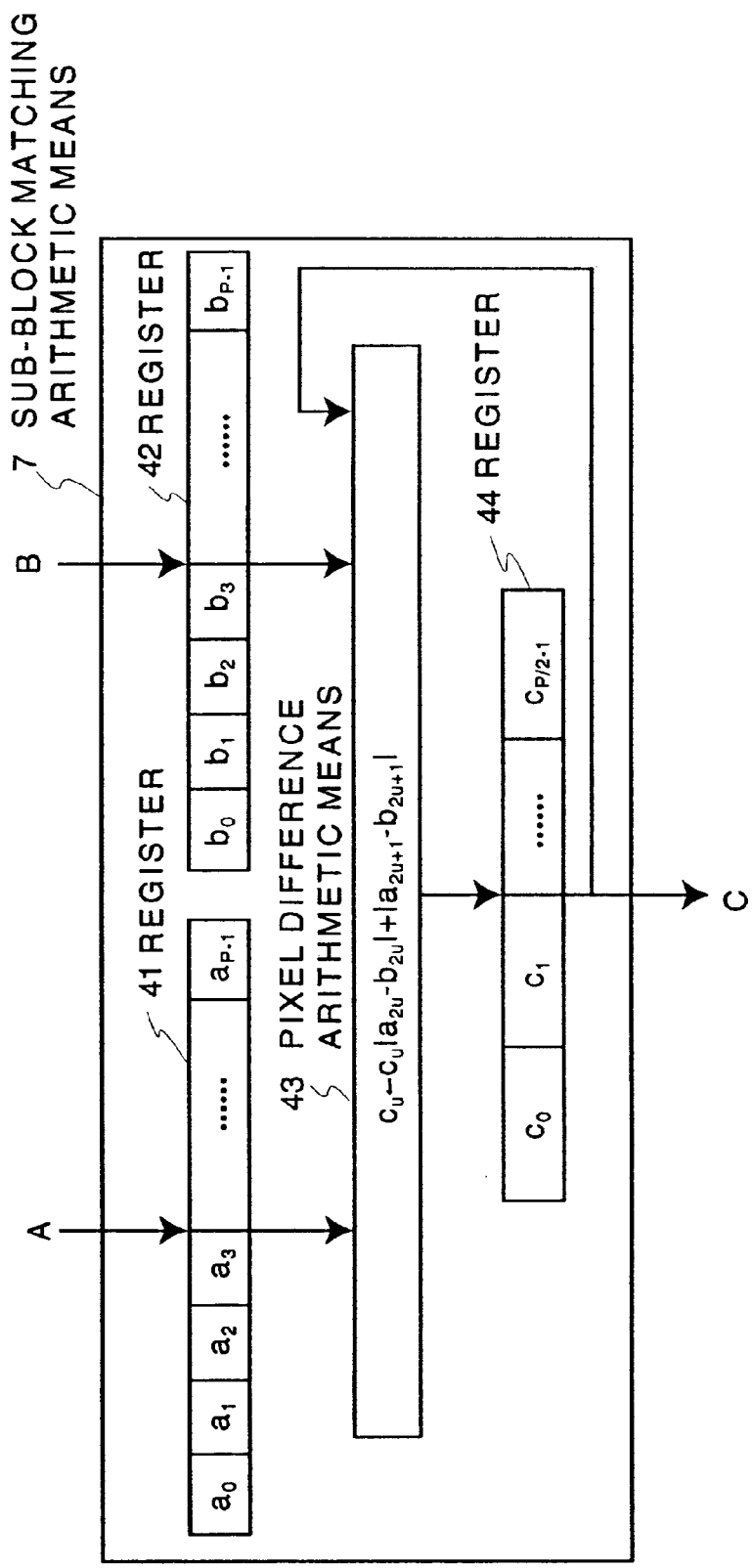
FIG. 4 is a block diagram for explaining the operation of the sub-block matching arithmetic means 7.
Figure 15:
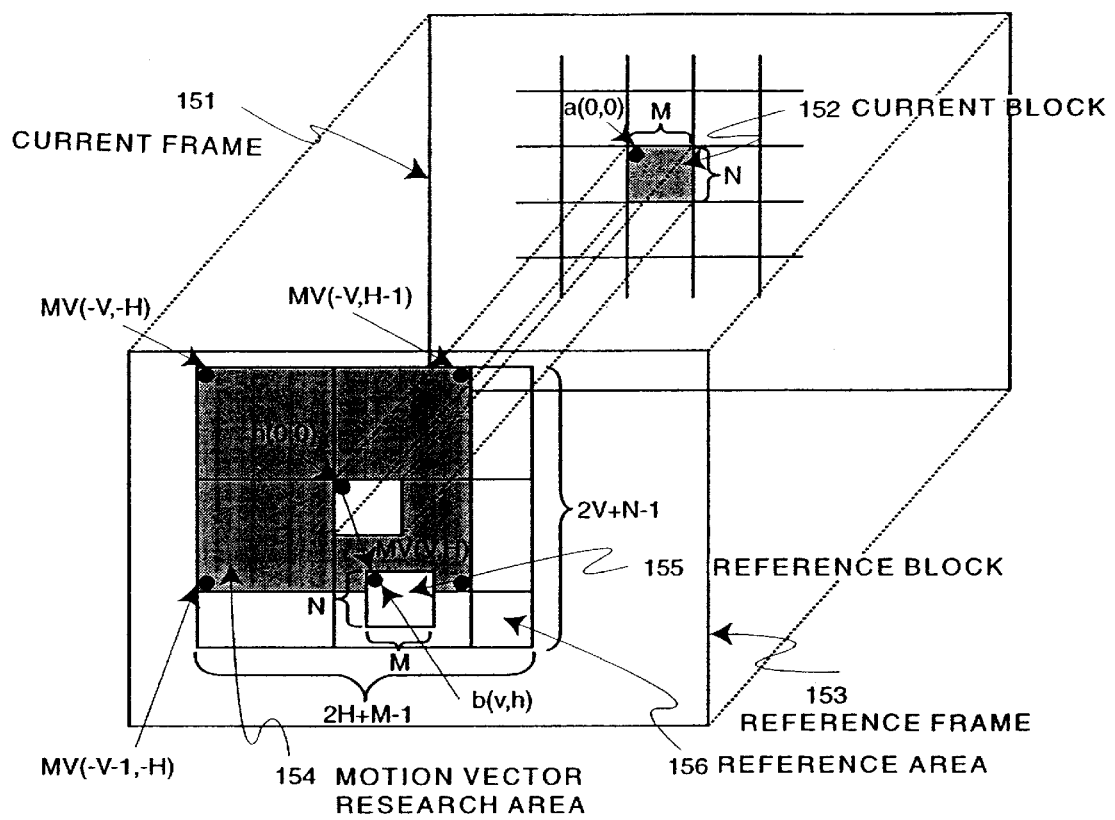
FIG. 15 is a diagram illustrating the relationship between current blocks and reference blocks.
Figure 16:
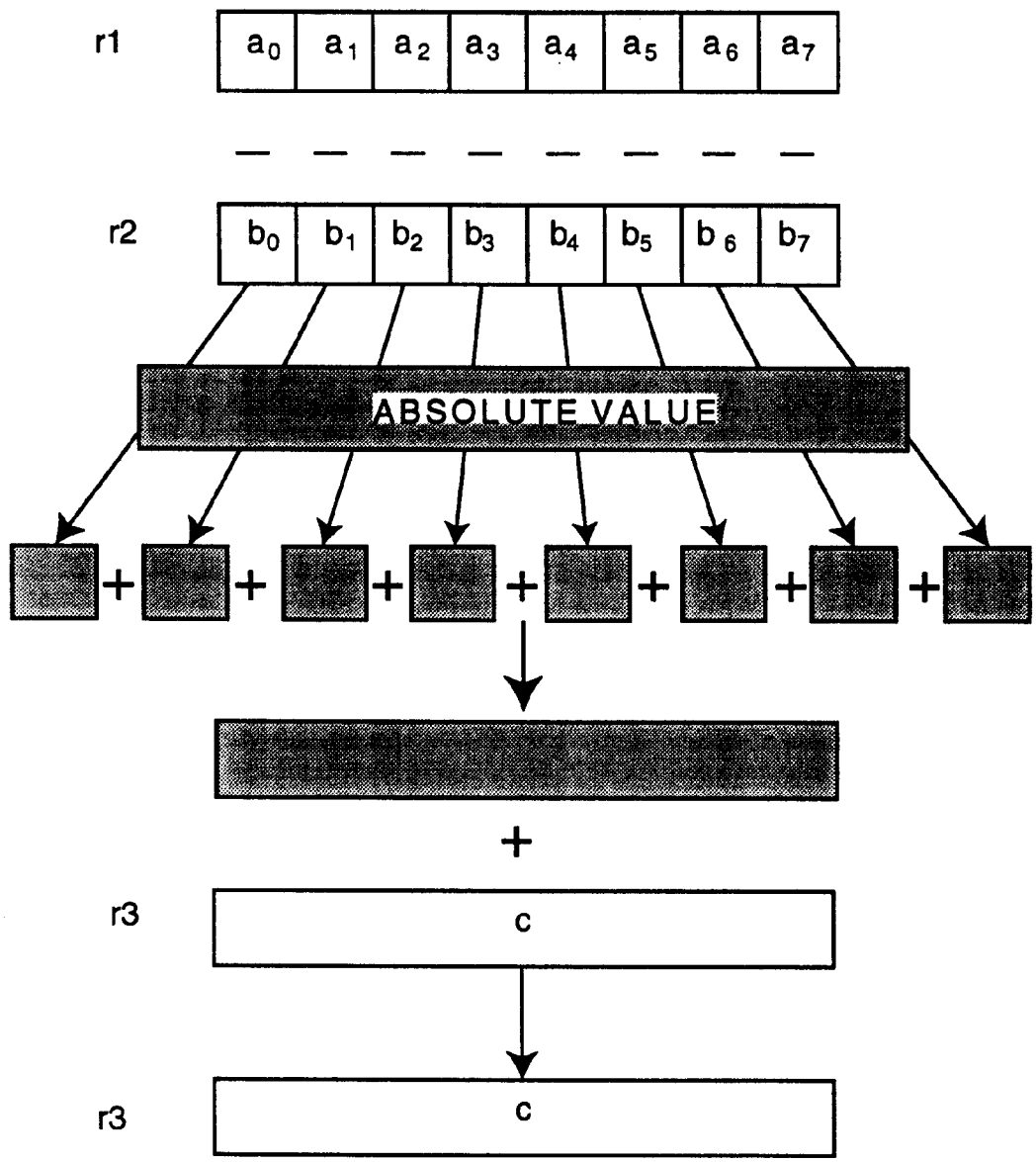
FIG. 16 is a diagram for explaining the operation of a block matching arithmetic instruction in a related art.
Figure 17:
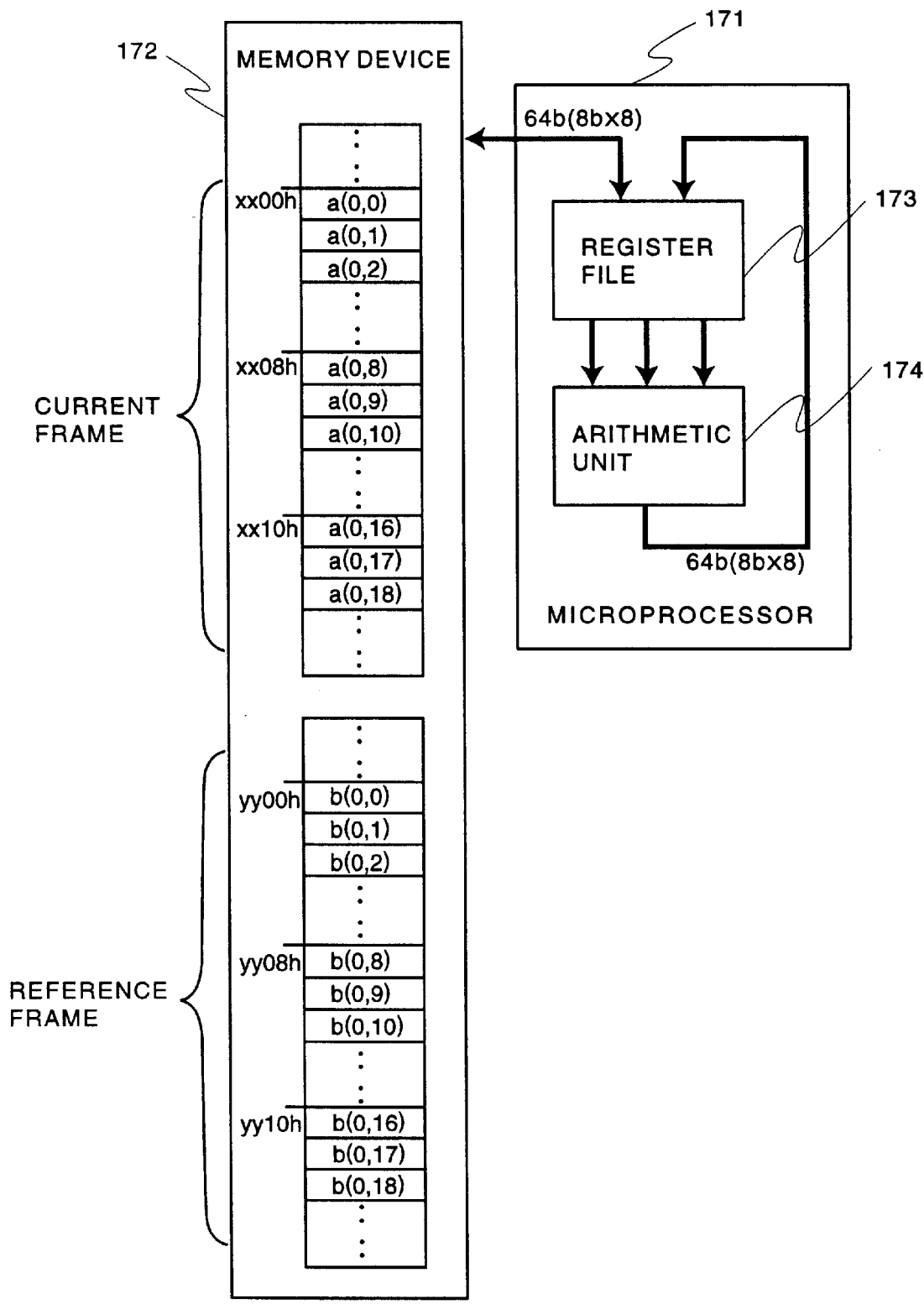
FIG. 17 is a block diagram for explaining the problem of a related-art block matching arithmetic device using a microprocessor.

It is now assumed that the block used for the block matching arithmetic operation is formed of a (N (lines)×M (rows)) pixel matrix as shown in FIG. 15 and that the motion vector search range 154 is the rectangular area defined by the segment 2H between the horizontal coordinates −H and (H−1) and the segment 2V between the vertical coordinates −V and (V−1), where the upper left point of the current block 152 has the coordinates (0, 0). Hence, the reference area 156 is formed of the (2V+N−1) to (2H+M−1) pixel lines. Moreover, it is assumed that the sub-block matching arithmetic means 7 can process in parallel P pixels as shown in FIG. 4 so that one line in the block is divided into Q (=M/P) for processing. Data on the current block and the reference area includes data for several pixels and can be arranged to read out in word units. The row of current blocks and the row of reference areas corresponds to a size an integral multiple of a word. The points of the first row of pixels are on the word boundary.

The data processing device 1 reads a current block in an (N×M) pixel matrix out of the current frame memory 13 to search a motion vector and reads a reference area of a ((2V+M−1)×(2H+M−1)) pixel matrix out of the reference frame memory 14.

The right-rotate-shifted current block creation means 4 creates P/2 right-rotate-shifted current blocks by rotating pixels of a current block by 0 pixel, two pixels, . . . , (P−2) pixels in the right direction and then stores them into the current block storage unit 10.

FIG. 2 is a table of the processing operations of the right-rotate-shifted current block creation means 4.

Referring to FIG. 2(a), CB represents an input current block from the current frame memory 13; a(i, j) represents a pixel datum; and a(0, 0) represents a pixel datum corresponding to the upper left position.

Referring to FIG. 2(b), CB(r) represents the position of pixel data when pixel data is rotated by r(r=0, 2, 4, . . . , P−2) in the right direction. The pixel at the coordinates (i, j) of CB(r) is expressed as CB(r, i, j)=a(i, (M−r+j) % M), where % represents a modulo arithmetic).

FIG. 2(c) indicates the position of pixel data of a right-rotate-shifted current block in the case of r=0, 2, 4, . . . , (P−2). The pixel CB(0) represents a block clockwise-rotated by 0 pixel and corresponds to the input current block CB. The pixel CB(2) represents a block obtained by clockwise-rotating the current block CB by two pixels. CB(2) is right-moved by two pixels in row units. For example, the pixel a(i, 0)(i=0, 1, 2, . . . , N−1) in the first row is moved to the third row. The pixel in the (M−1)-th row is moved to the first row. The pixel in the M-th row is moved to the second row.

As described above, the right-rotate shifted current block creation means 4 creates P/2 right-rotate-shifted current blocks CB(0), CB(2), CB(4), ..., CB(P−2) by clockwise-rotating the current block CB by 0 pixel, 2 pixels, 4 pixels, ..., (P−2) pixels and then stores them into the current block storage unit 10. At this time, the positions of the pixels of the first row in the right-rotate-shifted current blocks CB(0), CB(2), CB(4), ..., CB(P−2) stored at a word boundary.

The left-shifted reference area creation means 6 creates a left shift reference area by moving respective pixels of an input reference area from the reference frame memory 14 by one pixel in the left direction and then stores two pieces of reference area data regarding the input reference area and the left-shifted reference area into the reference area storage unit 11.

FIG. 3 is a diagram explaining the processing operation of the left-shifted area creation means 6.

FIG. 3(a) shows pixel data b(i, j) of the reference area RA. b(0, 0) indicates the upper left position of a current block, that is, the point corresponding to a(0, 0). When the motin vector points to a(0, 0), the motion vector is represented as MV(0, 0).

FIG. 3(b) shows the pixel position when the reference area RA is left-shifted by 1(1=0, 1) pixels. The pixel at the position of (i (line), j (row)) in the reference area RA(1) is expressed as the formula, RA(1, i, j)=b(i−V, 1+J−H).

FIG. 3(c) shows the reference area RA(0) in the case of 1=0 and the reference area RA(1) in the case of 1=1. The reference area RA(0) is the same as the reference area RA. The left-shifted reference area RA(1) is provided by shifting the reference area RA by one pixel in the left direction and is moved by one pixel in row units. For example, the pixel at the coordinates (i, j) is moved to the coordinates (i, j−1). The pixel b(i, −H) (i=−V, 1, 2, ..., V+N−1) of the leftmost row is removed by shifting. The pixel b(i, 1−H) of the second row is moved to the leftmost row. The rightmost row becomes in a data empty state by left shifting. The left-shifted reference area creation means 6 stores two pieces of data shown in FIG. 3(c) regarding the reference area RA(0) and the left-shifted reference area RA(1) into the reference area storage unit 11. In this case, the positions of the pixels in the first row in the reference area RA(1) and the positions of the pixels in the first row in the left-shifted reference area RA(1) define a word boundary.

The sub-block matching arithmetic means 7 executes in parallel a sub-block matching arithmetic operation of the current block and the right-rotate-shifted current block taken out of the current block storage unit 10 as well as the reference area and the reference block taken out of the left-shifted reference area stored in the reference area storage unit 11.

FIG. 4 is a block diagram showing the configuration of the sub-block matching arithmetic means 7. Pixel data row {a0, a1, ..., a$_{p-1}$} existing in sub-blocks obtained by separating a current block by P rows are input to the input A while pixel data row {b0, b1, ..., b$_{p-1}$} existing in sub-blocks obtained by separating a reference block by P rows are input to the input B. The register 41 stores the input pixel data row {a0, a1, ..., a$_{p-1}$} while the register 42 stores the input pixel data row {b0, b1, ..., b$_{p-1}$}.

The pixel difference arithmetic means 43 first obtains the absolute values of differences of pixel data, |a0−b0|, |a1−b1|, ..., |a$_{p-1}$−b$_{p-1}$|, existing in the same position based on the pixel data row {a0, a1, ..., a$_{p-1}$} stored in the register 41 and the pixel data row {b0, b1, ..., b$_{p-1}$} stored in the register 42. Next, the sum of the absolute values of neighbor differences are obtained.

For example, the sum c0 of |a0−b0| and |a1−b1|, the sum c1 of |a2−b2| and |a3−b3|, ..., and the sum c$_{p/2-1}$ of |a$_{p-2}$−b$_{p-2}$| and |a$_{p-1}$−b$_{p-1}$| are obtained. Moreover, the cumulative value of the sum c0, c1, ..., c$_{p/2-1}$ in the register 44 is added to the sum c0, c1, ..., c$_{p2-1}$ currently obtained and is stored into the register 44. That is, the pixel difference arithmetic means 43 executes the arithmetic operation expressed by the following formula (2).

$$c_u \leftarrow c_u + |a_{2u} - b_{2u}| + |a_{2u+1} - b_{2u+1}| \tag{2}$$

where u=0, 1, ..., P/2−1.

The following formula (3) can be obtained by repeating the above arithmetic operation to inputs for N lines.

$$Cu = \sum_N (|a_{2u} - b_{2u}| + |a_{2u+1} - b_{2u+1}|) \tag{3}$$

where u=0, 1, 2, ..., P/2−1.

Cu represents the result of a block matching operation executed by separating a block every two rows. The sub-block matching arithmetic means 7 outputs C={c0, c1, ..., c$_{p/2-1}$}.

The reason why CU is a sub-block matching arithmetic data for two pixel rows will be explained here. In order to prevent overflow from occurring on the way of the block matching arithmetic operation, it is needed to sufficiently lengthen the bit length of $c_u$. Generally, pixel data is represented in the form of 8 bits. It is considered that the bit length of CU expanded to 16 bits twice pixel bit length can sufficiently prevent overflow. In this case, it is better to equalize the input bit length of the pixel difference arithmetic means 43 to the output bit length thereof. It can be avoided that the output bit length becomes longer by adding difference data of two neighbor pixel rows.

Next, the procedure of inputting data to the sub-block matching arithmetic means 7 will be explained here.

First, the relationship between an N×M reference block and the positions of pixels will be explained by referring to FIG. 5. The reference block of the position of the motion vector MV(v, h) taken from the reference area RA(1) is represented by RB(l, v, h). At this time, the upper left pixel of the reference block RB(l, v, h) becomes b(v, h+1). The pixel at the coordinates (i, j) is represented as RB(l, v, h, i, j)=b(v+i, h+1+j).

The sub-block matching arithmetic means 7 executes a sub-block arithmetic operation of P combinations in total obtained by combining the current block CB(r) and the reference block RB(l, v, h), as shown in FIG. 6. The sub-block matching arithmetic operation may be sequentially executed every combined blocks or plural differently-combined blocks may be interleaved.

Next, explanation will be made as to the arithmetic results obtained by executing the sub-lock matching arithmetic DF=∥CB(r)−RB(l, v, h)∥ with the combinations shown in FIG. 6.

Figure 7:
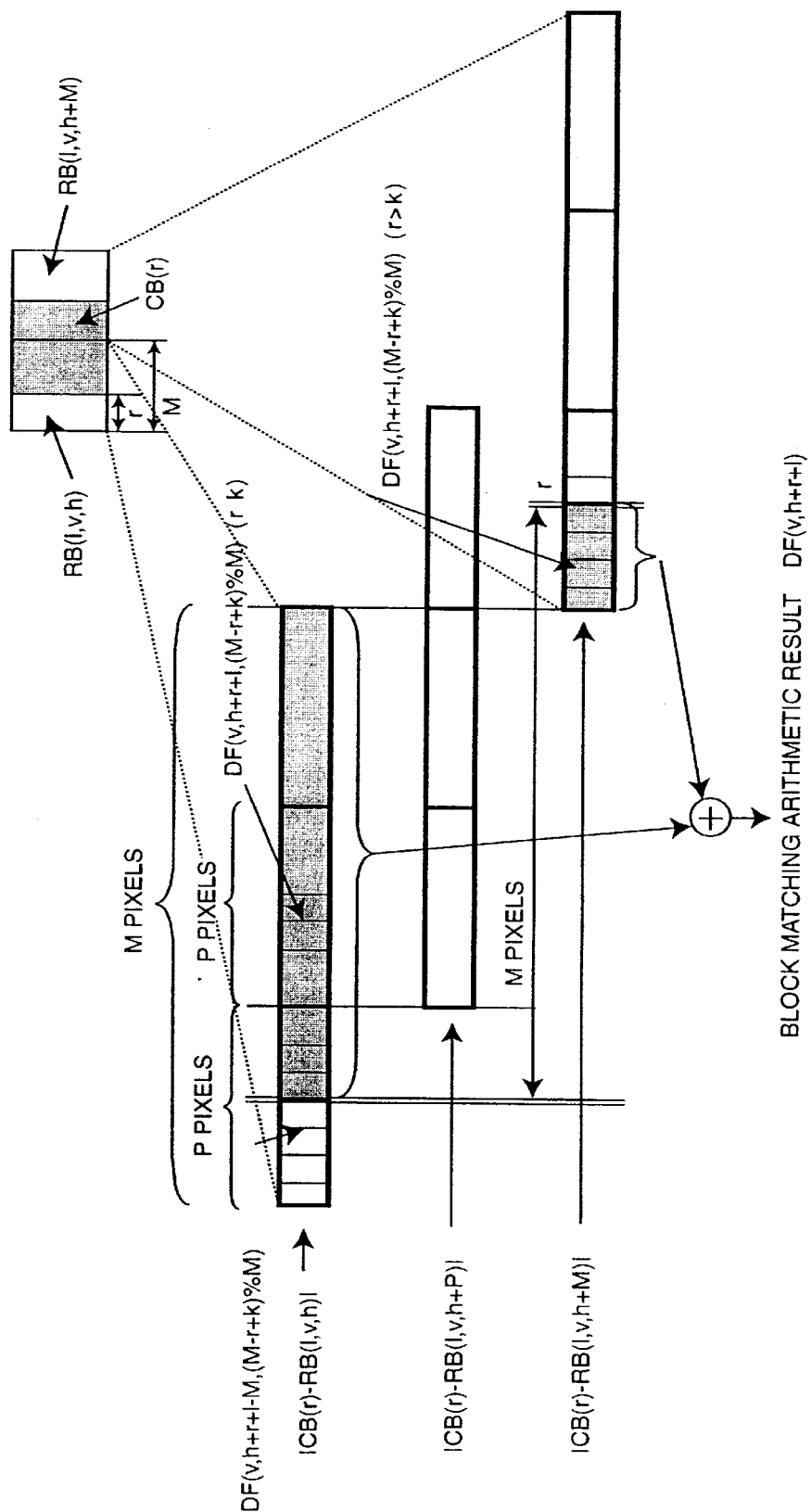
FIG. 7 is a diagram illustrating the method of computing block matching arithmetic results from sub-block matching arithmetic data.

FIG. 7 is a diagram showing the relationship between the current block CB(r), the reference block RB(l, v, h), and the sub-block matching arithmetic results DF. The sub-block matching arithmetic means 7 outputs the results obtained by accumulating absolute difference absolutes of two neighbor pixels among the difference absolute values of P pixel data. Since the size of the block is N (line)×M (row), the sub-block matching operation is executed every P rows and is repeated (M/P) times. The result obtained by a sub-block matching arithmetic operation of the k-th sub-block (where k=0, 2, 4, ..., M−2) from the left of the block is expressed by the following formulas (4) and (5).

In the case of r≦k, DF is expressed as follows:

$$DF(v, h+r+l-M, (M-r+k)\%M) = \qquad (4)$$
$$\sum_{i=0}^{N-1}(|a(i, (M-r+k)\%M) - b(v+i, h+r+l+k)| +$$
$$|a(i, (M-r+k+1)\%M) - b(v+i, h+r+lK+1)|)$$

In the case of r>k, DF (v', h', k') is expressed as follows:

$$DF(v, h+r+l-M, (M-r+k)\%M) = \qquad (5)$$
$$\sum_{i=0}^{N-1}(|a(i, (M-r+k)\%M) - b)v+i, h+r+l+k)| +$$
$$|a(i, (M-r+k+1)\%M) - b(v+i, h+r+l+k+1)|)$$

where DF(v', h', k') shows the k'-th sub-block matching arithmetic operation of the motion vector MV(v', h').

As shown in FIG. 6, by combining CB(r)(r 0, 2, 4, ..., P–2) with RB(l, v, h) (l=0, 1), the sub-block matching arithmetic operation can be executed ranging from the motion vector MV(v, h+2–M) to MV(v, h+P–1–M) and from the motion vector MV(v, h) to MV(v, h+P–1).

A sub-block matching arithmetic operation is sequentially executed to the reference block at positions horizontally shifted by P pixels, that is, RB(l, v, h+P), RB(l, v, h+2P), RB(l, v, h+3P), .... The sub-block matching arithmetic results are stored into the sub-block matching arithmetic data storage unit 12. The sum arithmetic means 9 takes the sub-block matching arithmetic result data regarding the same motion vector out of the sub-block matching arithmetic data storage unit 12 and then obtains the sum thereof, thus outputting it as block matching arithmetic data. When two reference blocks including the reference block RB(l, v, h) and the reference block RB(l, v, h+M) at the position horizontally shifted by M pixels have been completely subjected to arithmetic operation, all sub-block matching arithmetic results regarding motion vectors ranging from MV(v, h) to MV(v, h+P) are obtained.

In FIG. 7, the shaded portions corresponding to the sub-block matching arithmetic data show sub-block matching arithmetic data regarding the motion vector MV(v, h+r+l).

The sub-block matching arithmetic data can be divided into two regions, that is, the reference block RB(l, v, h) and the reference block RB (l, v, h+M) horizontally shifted by M pixels. Hence, a complete block matching arithmetic result DF(v, h+r+l) can be obtained by calculating the sum of the shaded portions.

[Embodiments]

Figure 8:
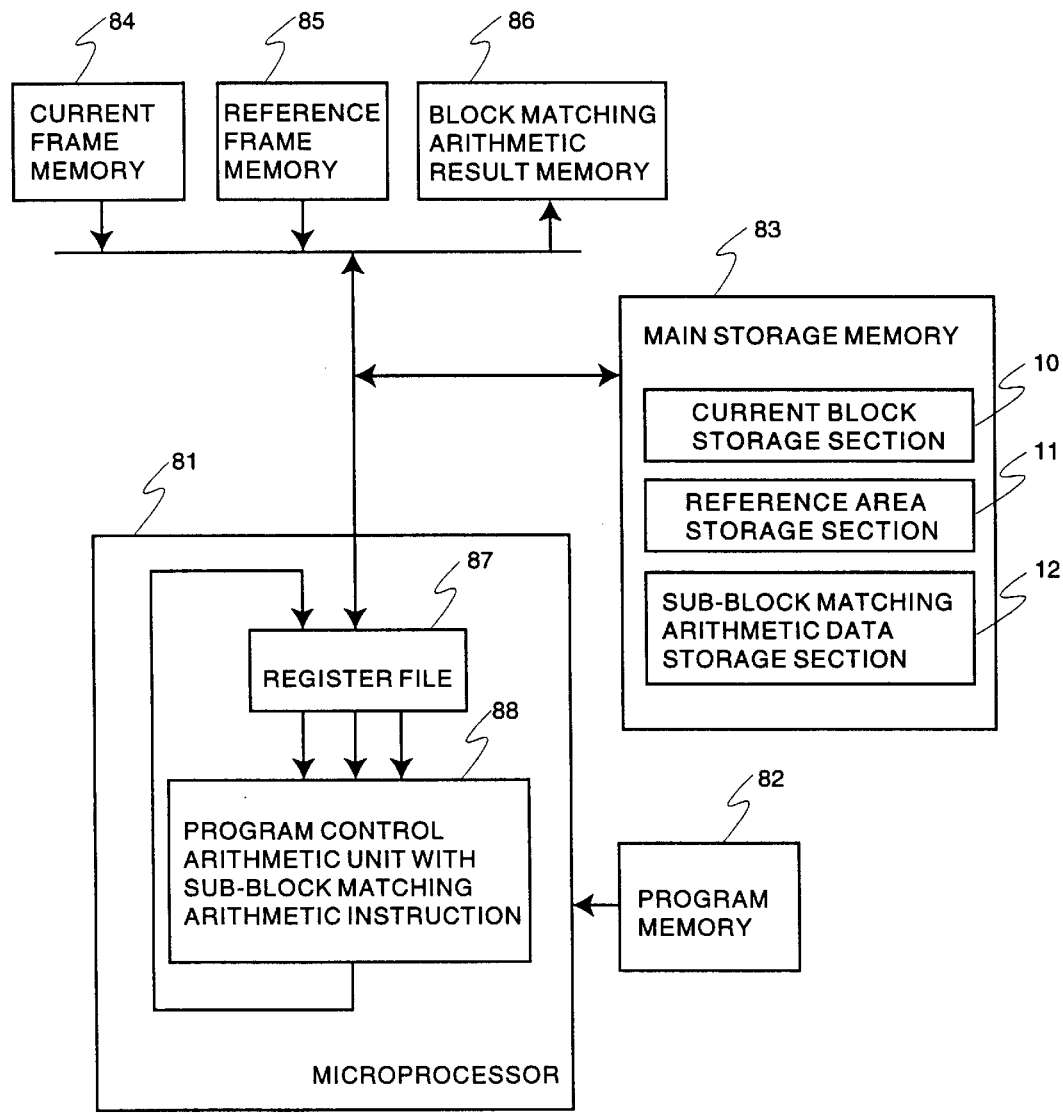
FIG. 8 is a block diagram illustrating a block matching arithmetic device according to an embodiment of the present invention.

FIG. 8 is a block diagram illustrating a block matching arithmetic device according to an embodiment of the present invention. The block matching arithmetic device consists of a microprocessor 81 for executing a block matching arithmetic operation, a program memory 82 for storing a program for the microprocessor 81, a main storage memory 83 (hereinafter refereed to as a main storage unit) for temporarily storing data, a current frame memory 84 for storing current frame data, a reference frame memory 85 for storing reference frame data, and a block matching arithmetic result memory 86 for storing block matching arithmetic results.

The microprocessor 81 includes a register file 87 for temporarily storing data, and a program control arithmetic unit 88 which has a sub-block matching arithmetic instruction for executing data processing such as sub-block matching arithmetic operation, shift, rotation shift, and data swapping. The main storage unit 83 includes a current block storage unit 10, a reference area storage unit 11, and a sub-block matching arithmetic data storage unit 12.

Next, the operation of the present embodiment will be described here. For a brief explanation, it is assumed that the current block and the reference block respectively have a size of 16×16 pixels (M=N=16) and that data for one pixel is represented by 8 bits. Moreover, it is assumed that one word in the microprocessor 81 is 64 bits, and that one word stores data for 8 pixels, and that the program control arithmetic unit 88 with sub-block matching arithmetic instructions can process in parallel data for 8 pixels (P=8) First, the microprocessor 81 takes the current block CB out of the current frame memory 84 to create 4 (P/2) right-rotate-shifted current blocks: CB(0), CB(2), CB(4), CB(6). This operation can be realized using the concatenate-right-shift instruction executed by the program control arithmetic unit 88.

Figure 9:
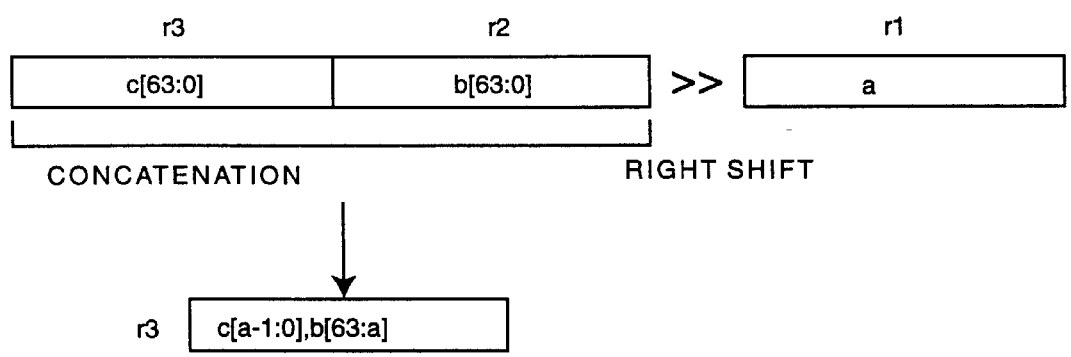
FIG. 9 is a diagram for explaining the operation of a concatenation right shift instruction.

FIG. 9 shows the operation of the concatenate-right-shift instruction shr3 r1, r2, r3. The concatenate-right-shift instruction shr3 right-shifts data in which the contents of two registers r2 and r3 are concatenated, by the number of bits designated by the register r1, and then directs the register r3 to store the result. For example, where a right rotation shift current block CB(2) is created, the instruction is as follows:

r1=16 r2={a(i, 0), a(i, 1), a(i, 2), a(i, 3), a(i, 4), a(i, 5), a(i, 6), a(i, 7)} r3={a(i, 8), a(i, 9), a(i, 10), a(i, 11), a(i, 12), a(i, 13), a(i, 14), a(i, 15)}

When the concatenate-right-shift instruction shr3 r1, r3, r2 is executed, r3={a(i, 14), a(i, 15), a(i, 0), a(i, 1), a(i, 2), a(i, 3), a(i, 4), a(i, 5)}

Next, under the following condition, r4={a(i, 8), a(i, 9), a(i, 10), a(i, 11), a(i, 12), a(i, 13), a(i, 14), a(i, 15)}

When the concatenate-right-shift instruction shr3 r1, r2, r4 is executed, r4={a(i, 6), a(i, 7), a(i, 8), a(i, 9), a(i, 10), a(i, 11), a(i, 12), a(i, 13)}

Hence, the right-rotate-shifted current block can be easily created based on contents of r3 and r4. Data of the right-rotated-shift current block is stored in a word data format into the current block storage unit 10.

Figure 10:
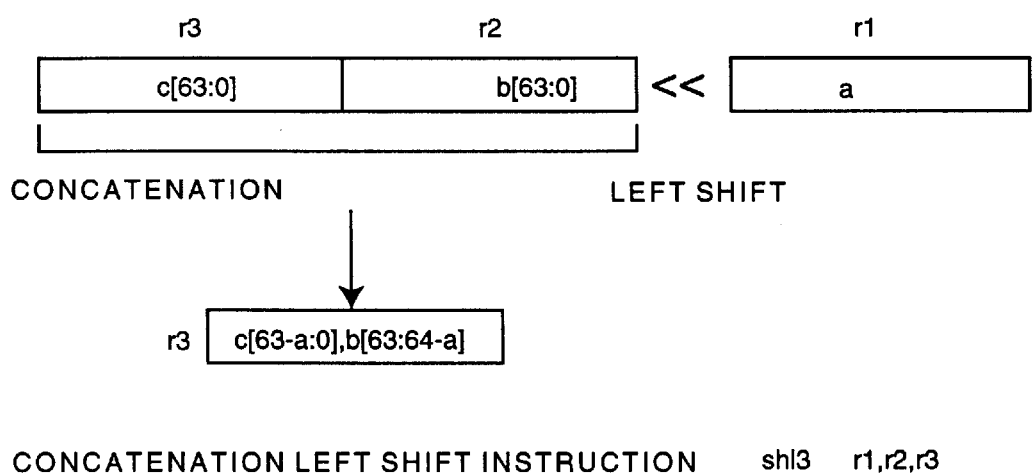
FIG. 10 is a diagram for explaining the operation of a concatenation left shift instruction.

Next, the right-shifted reference areas RO(0) and RA(1) are created based on the reference area RA. The creation can be realized with the concatenate-left-shift instruction executed by the program controlled arithmetic unit 88. FIG. 10 shows the operation of the concatenate-left-shift instruction shl3 r1, r2, r3. The concatenate-left-shift instruction shl3 left-shifts data in which the contents of two registers r2 and r3 are concatenated, by the number of bits designated by the register r1, and then instructs the register r3 to store the result. For example, where the left shifted reference area RA(1) is created, r1=8 r2={b(i, 0), b(i, 1), b(i, 2), b(i, 3), b(i, 4), b(i, 5), b(i, 6), b(i, 7)} r3={b(i, 8), b(i, 9), b(i, 10), b(i, 11), b(i, 12), b(i, 13), b(i, 14), b(i, 15)}

When the concatenate-left-shift instruction shl3 r1, r3, r2 is executed, the following relation is obtained:

r3={b(i, 0), b(i, 1), b(i, 2), b(i, 3), b(i, 4), b(i, 5), b(i, 6), b(i, 7)}

As a result, the left-shifted reference area RA(1) can be easily created. Data in the left-shifted reference area is stored in a word data format into the reference area storage unit 11.

Figure 11:
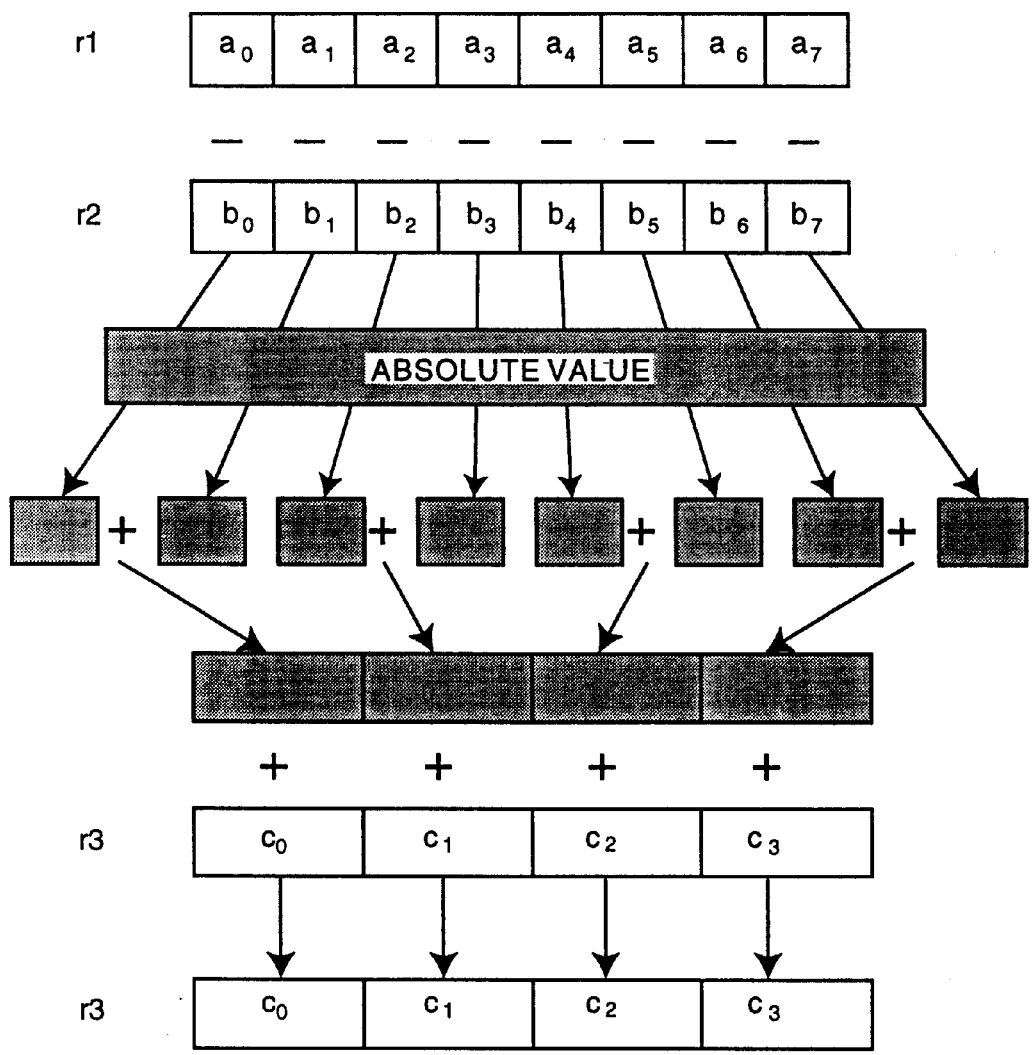
FIG. 11 is a diagram for explaining the operation of a sub-block matching arithmetic instruction.

Next, the sub-block matching arithmetic data is obtained based on the current block CB(r) and the reference block RB(l, v, h). The sub-block matching arithmetic operation by the program controlled arithmetic unit 88 will be described by referring to FIG. 11.

The sub-block matching arithmetic instruction pbm r1, r2, r3 obtains the absolute value |ai−bi| (i=0, 1, 2, . . . , 7) of the difference between 8 pixels stored in the registers r1 and r2, adds two neighbor absolute values, and then adds to the content of the accumulator r3. An example is as follows:

r1={a(i, 0), a(i, 1), a(i, 2), a(i, 3), a(i, 4), a(i, 5), a(i, 6), a(i, 7)} r2={b(i, 0), b(i, 1), b(i, 2), b(i, 3), b(i, 4), b(i, 5), b(i, 6), b(i, 7)} r3={0, 0, 0, 0}

When pbm instruction is executed from i=0 to i=15, r3={c0, c1, c2, c3}, where c0 to c3 are expressed by the following formulas (6) to (9).

$$c_0 = \sum_{i=0}^{15} (|a(i, 0) - b(i, 0)| + |a(i, 1) - b(i, 1)|) \quad (6)$$

$$c_1 = \sum_{i=0}^{15} (|a(i, 2) - b(i, 2)| + |a(i, 3) - b(i, 3)|) \quad (7)$$

$$c_2 = \sum_{i=0}^{15} (|a(i, 4) - b(i, 4)| + |a(i, 5) - b(i, 5)|) \quad (8)$$

$$c_3 = \sum_{i=0}^{15} (|a(i, 6) - b(i, 6)| + |a(i, 7) - b(i, 7)|) \quad (9)$$

Sub-block matching arithmetic data can be obtained according to the above-mentioned procedures. The sub-block matching arithmetic data is stored in a word data format into the sub-block matching arithmetic data storage unit 12 within the main storage memory (main storage unit) 83.

Next, explanation will be made as to the method of calculating complete block matching arithmetic results based on sub-block matching arithmetic data.

Figure 12:
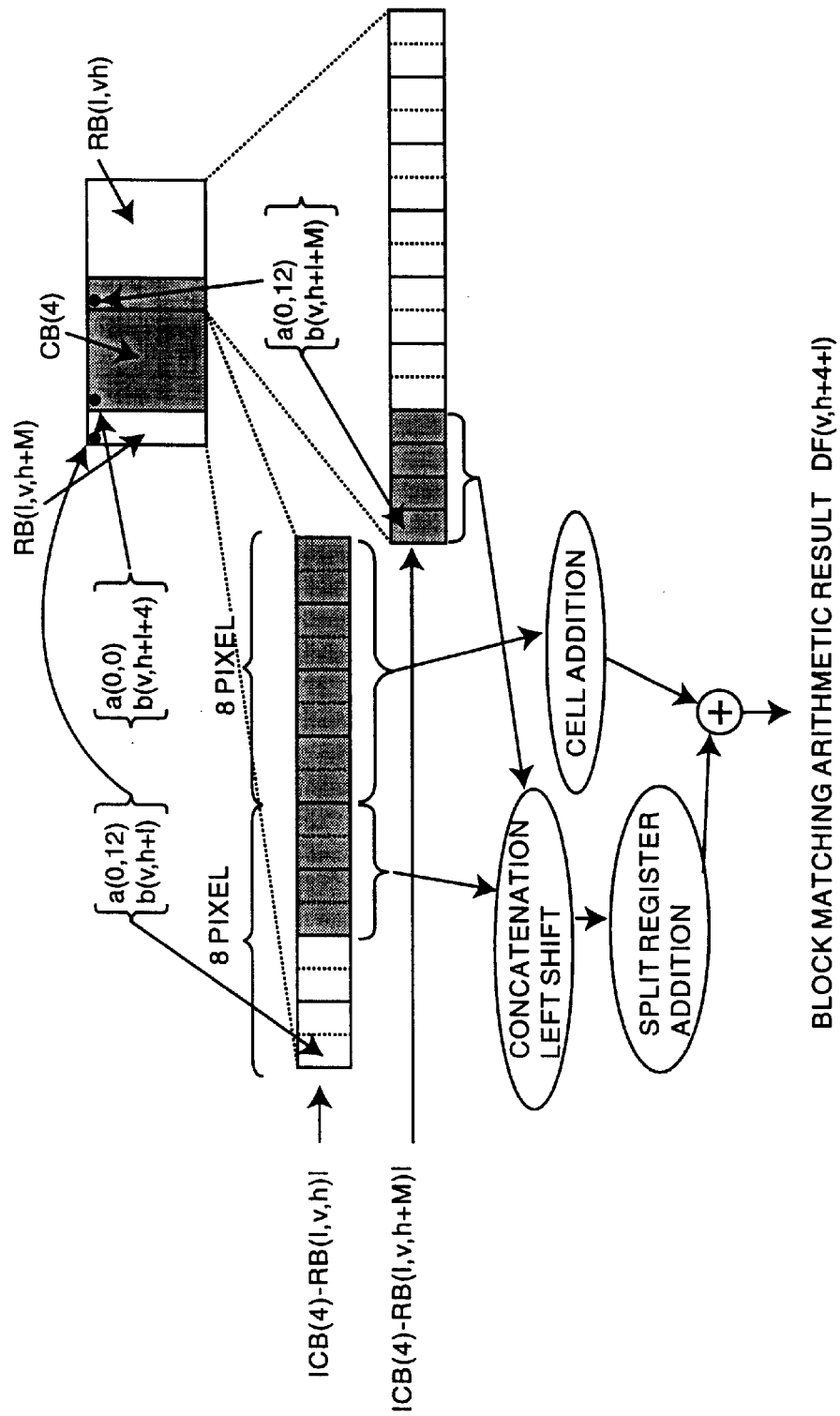
FIG. 12 is a diagram for explaining the procedure of obtaining block matching arithmetic results from sub-block matching arithmetic data.

FIG. 12 is a diagram explaining the case where results of a block matching arithmetic operation of a motion vector MV(v, h+4) can be obtained by combining the current block CB(4) and the reference block RB(l, v, h). The shaded portion in FIG. 12 represents necessary sub-block matching arithmetic data. This can be obtained by executing a sub-block matching arithmetic operation of the reference block RB(l, v, h) and RV(l, v, h+M).

Figure 13:
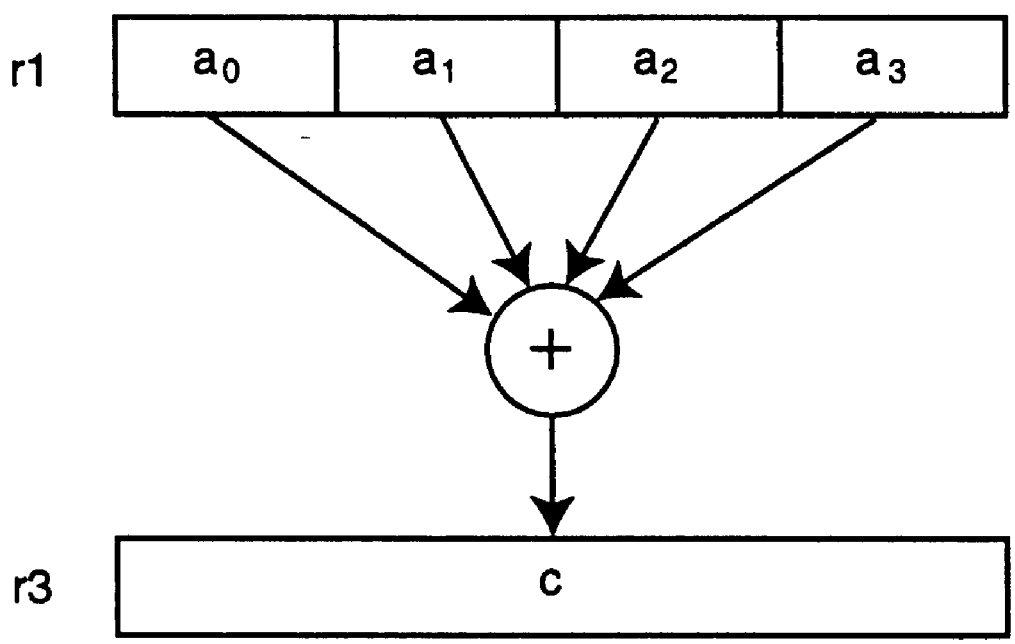
FIG. 13 is a diagram for explaining the operation of an instruction for computing the sum of data from four split registers.

Since only the content of the split register corresponding to a half of word data is required as data for 8 pixels of the former half of |CB(4)−RB(l, v, h)| and data for 8 pixels of the former half of |CB(4)−RB(l, v, h+M)|, the two contents are combined as one word using the concatenate-left-shift instruction. As shown in FIG. 13, the instruction is executed by obtaining the sum of respective pieces of data in four split registers. Since all pieces of data for 8 pixels of the latter half of |CB(4)−RB(l, v, h)| are required, the data in the four split registers are summed. Finally, complete block matching data can be obtained by adding two summed data. The block matching arithmetic result is stored into the sub-block matching arithmetic data storage unit 12 within the main storage unit 83.

Figure 14:
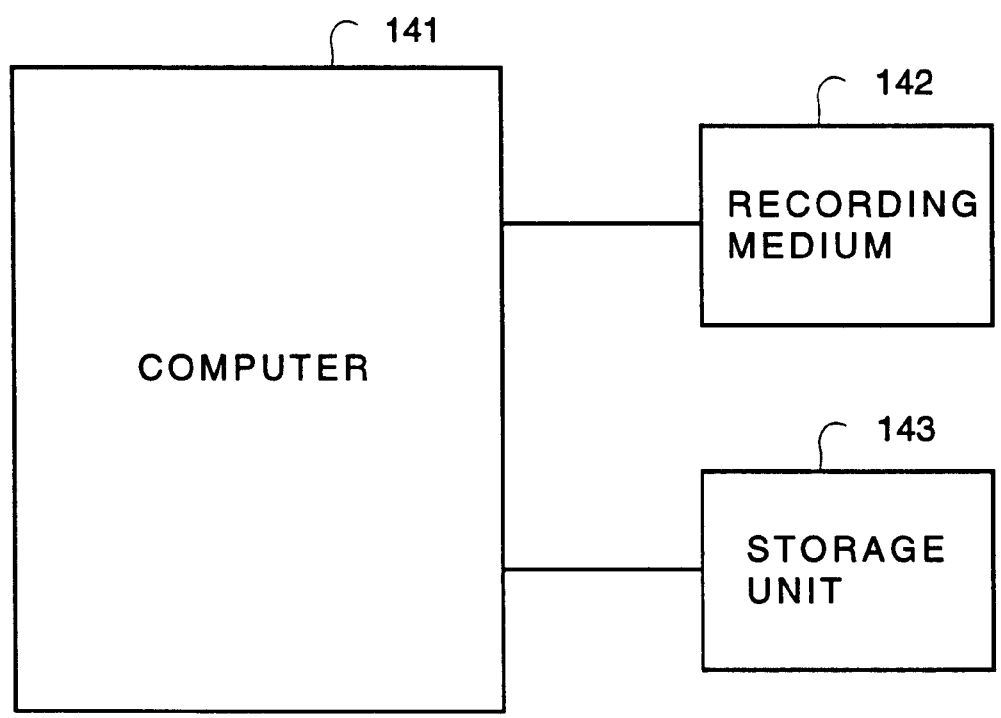
FIG. 14 is a block diagram illustrating another embodiment of the present invention.

FIG. 14 is a block diagram illustrating a block matching arithmetic device according to another embodiment of the present invention. The block matching arithmetic device consists of a computer 141, a recording medium 142, and a storage unit 143. The recording medium 142 is formed of a magnetic disc, a semiconductor memory, or other recording medium. The program recorded on the recording medium 142 is read in by the program computer 141. By controlling the computer 141, the program realizes the functions of the right-rotate-shift current block creation means 4, the left-shifted reference area creation means 6, the sub-block matching arithmetic means 7, and the sum arithmetic means 9 shown in FIG. 1. The current block storage unit 10, the reference area storage unit 11, the sub-block matching arithmetic data storage unit 12 shown in FIG. 1 are implemented on the storage unit 143.

According to the present invention, since the right-rotate-shifted current block obtained by rotating a current block as well as the left-shifted reference area obtained by shifting a reference area are previously created, the pixel handling is not needed in the block matching arithmetic operation. Hence, the first advantage is that the present invention can provide a high rate block matching arithmetic operation.

Moreover, According to the present invention, since plural pixels are stored in one word unit, the frequency that data is input to and output out of the storage unit can be reduced. Hence, the second advantage is that the present invention can use the storage unit with slow-rate input/output capability, thus reducing the memory costs.

The entire disclosure of Japanese Patent Application No. 9-210077 filed on Jul. 18, 1997 including specification, claims, drawing and summary are incorporated herein by reference in its entirety.

What is claimed is:

1. A block matching arithmetic device wherein a block matching arithmetic operation between a current block and a reference block is executed to search a motion vector used for video compression coding, comprising a current block storage section;

a reference area storage section;

a sub-block matching arithmetic data storage section;

right-rotate-shifted current block creation means for creating plural right-rotate-shifted current blocks by rotating pixels in a current block to be processed in the right direction every two pixels and for storing said plural right-rotate-shifted current blocks and said current block into said current block storage section;

left-shifted reference area creation means for creating a left shift reference area by shifting pixels in a reference area to said current block in the left direction by one pixel and for storing said left shift reference area and said reference area into said reference area storage section;

sub-block matching arithmetic means for storing sub-block matching arithmetic data into said sub-block matching arithmetic data storage section, said sub-block matching arithmetic data being obtained by dividing a block to be combined into sub-blocks every two rows when a current block and a right-rotate-shift-current block taken out of said current block storage section are combined with said reference block taken out of said left shift reference area and a reference area stored in said reference area storage section, and then implementing in parallel a block matching arithmetic operation to said sub-block groups; and summation arithmetic means for selecting sub-block matching arithmetic data required to compute a block matching arithmetic result regarding a motion vector, among sub-block matching arithmetic data in a reference area and sub-block matching arithmetic data regarding a reference block at a position horizontally spaced from said reference block by the number of rows of reference blocks, stored in said sub-block matching arithmetic data storage section, and then computing the sum of said data.

2. The block matching arithmetic device defined in claim 1, wherein said right-rotate-shifted current block creation means defines positions of pixels in a first row as a word boundary when both a current block and a right-rotate-shifted current block are stored into said current block storage section; and wherein said left-shifted area creation means defines positions of pixels in said first row as a word boundary when a reference area and a left-shifted reference area are stored into said reference area storage section.

3. The block matching arithmetic device according to claim 2, wherein said sub-block matching arithmetic means comprises a program controlled arithmetic unit incorporated in a microprocessor, said arithmetic unit having an instruction of computing absolute differences between pixel data at the same position to two pieces of word data formed of plural pieces of pixel data to be input, adding two neighbor absolute values to obtain a sum, and accumulating said sum to an addition result obtained by a previous arithmetic operation.

4. The block matching arithmetic device according to claim 1, wherein said current block is read out of a current frame memory; and wherein said reference frame is read out of a reference frame memory.

5. The block matching arithmetic device according to claim 1, wherein said sub-block matching arithmetic operation is sequentially executed every combined blocks.

6. The block matching arithmetic device according to claim 1, wherein said sub-block matching arithmetic operation is executed by interleaving plural differently-combined blocks.

7. A block matching arithmetic device wherein a block matching arithmetic operation between a current block and a reference block is executed to search a motion vector used for time-varying image compression coding, comprising:

a current frame memory for storing current frame data;

a reference frame memory for storing reference frame data;

a block matching arithmetic result memory for storing block matching arithmetic results;

a microprocessor connected to said current frame memory, said reference frame memory and said block matching arithmetic result memory, for executing a block matching arithmetic operation and for creating plural right rotation shift current blocks from a current block out of said current frame memory under a concatenation right shift instruction and for creating plural left shift reference areas from a reference area under a concatenate-left-shift instruction;

a program memory connected to said microprocessor, for storing a program for the microprocessor; and a main storage memory connected to said microprocessor via a bus, for temporarily storing data.

8. The block matching arithmetic device according to claim 7, wherein said microprocessor comprises a register file for temporarily storing data; and a program controlled arithmetic unit which has a sub-block matching arithmetic instruction for executing data processing; said program controlled arithmetic unit executing said concatenate-right-shift instruction and said concatenate-left-shift instruction; said program controlled arithmetic unit calculating a sub-block matching arithmetic data based on said current block and said reference block.

9. The block matching arithmetic device according to claim 7, wherein said main storage memory comprises a current block storage unit for storing data regarding said right rotation shift current block in a word data format, a reference area storage unit, and a sub-block matching arithmetic data storage unit for storing said sub-block matching arithmetic data in a word data format.

10. A machine-readable recording medium for recording a program which works as a block matching arithmetic device a computer including a current block storage section, a reference area storage section and a sub-block matching arithmetic data storage section, said block matching arithmetic device executing a block matching arithmetic operation for a current block and a reference block to search a motion vector used for video compression coding, said program further operating said computer as functions of right-rotate-shifted current block creation means for creating plural right-rotate-shifted current blocks by rotating pixels of a current block to be processed in the right direction every two pixels and for storing said plural right-rotate-shifted current blocks and said current block into said current block storage section; left-shifted reference area creation means for creating a left-shifted reference area by shifting pixels in a reference area to said current block in the left direction by one pixel and for storing said left-shifted reference area and said reference area into said reference area storage section; sub-block matching arithmetic means for storing sub-block matching arithmetic data into said sub-block matching arithmetic data storage section, said sub-block matching arithmetic data being obtained by dividing a block to be combined into sub-blocks every two rows when a current block and a right rotation shift current block taken out of said current block storage section are combined with a reference area stored in said reference area storage section and said reference block taken out of said left-shifted current block, and then implementing in parallel a block matching arithmetic operation to sub-block groups; and summation arithmetic means for extracting sub-block matching arithmetic data required to compute a block matching arithmetic result regarding a motion vector, from sub-block matching arithmetic data in a reference area and sub-block matching arithmetic data regarding a reference block at a position horizontally spaced from said reference block by the number of rows of reference blocks, stored in said sub-block matching arithmetic data storage section, and then computing the sum of said data.

* * * * *